(12) United States Patent
Enokida et al.

(10) Patent No.: US 6,424,485 B1
(45) Date of Patent: Jul. 23, 2002

(54) ADAPTIVE SKEW SETTINGS FOR A DISK DRIVE

(75) Inventors: Yoko Enokida, Milpitas; Richard D. Pitzer; Karman Tam, both of San Jose, all of CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/277,506

(22) Filed: Mar. 26, 1999

(51) Int. Cl.[7] .................. G11B 20/20; G11B 5/596; G11B 15/12
(52) U.S. Cl. .................. 360/76; 360/63; 360/78.04
(58) Field of Search .................. 360/61, 76, 78.04, 360/75, 63, 78.08; 324/210, 212

(56) References Cited

U.S. PATENT DOCUMENTS 5,835,299 A * 11/1998 Lee et al. ............. 360/76

* cited by examiner

*Primary Examiner*—Andrew L. Sniezek
(74) *Attorney, Agent, or Firm*—David M. Sigmond; Steven G. Roeder; James P. Broder

(57) ABSTRACT

A method for improving disk drive performance by adaptively calculating skew values for each drive. During a production phase of the disk drive manufacturing process, skew values are calculated using measured seek times, then implemented to each drive. The calculation scheme permits slipped revolutions to occur during a percentage of the time so that skew values are not so high as to hinder high performance.

44 Claims, 2 Drawing Sheets

ADAPTIVE SKEW SETTINGS FOR A DISK DRIVE

FIELD OF THE INVENTION

The present invention relates generally to methods for use in disk drives for computer systems. More particularly, the present invention relates to methods for improving disk drive performance by determining and implementing skew settings for each drive.

BACKGROUND OF THE INVENTION

Within data storage devices, e.g. disk drives, the phrase 'seek time' describes the latency realized from the initiation of a seek process until data can be transferred. If a data transfer crosses a head or cylinder boundary, i.e., data associated with the last sector of a track and the first sector of the next sequential track are included in the transfer, there is a negative impact on data throughput since the movement of data must be interrupted while a head switch or single-cylinder seek procedure is completed.

A 'skew' of a track is defined as the physical offset of logical sector zero of the target track from logical sector zero of the preceding track. The purpose of the skew is to improve disk drive performance by compensating for the rotation of the medium that occurs during the time it takes to complete a corresponding seek operation. The size of the physical offset, or the 'skew value', is determined by the seek time associated with the required operation.

Disk drive units typically use two different track skew values, head skew and cylinder skew. Since the time required to complete a head switch operation will usually differ from that required for a single-cylinder seek, a different skew is used on the target track associated with each operation. For example, in a disk drive unit having n heads, track zero of each cylinder is always assumed to be the target track following a single-cylinder seek and is given a track skew, or cylinder skew, which is consistent with that operation. During a head switch, each of the tracks 1 through n−1 of each cylinder is always assumed to be a target track and receives a track skew, or head skew, which is consistent with that operation.

In the past, skew values associated with a particular disk drive product were determined during the product development cycle. All disk drive units in a product line carried the same skew values. Skew values were determined by several factors, among them head mass, disk rotation speed (RPM), flexibility of the flex cable, etc. The prevailing approach was to use skew values that would avoid 'slipped revolutions', which refers to those instances in which a data transfer is delayed a full disk revolution because of an intervening head switch or single cylinder seek operation. The ironic consequence of this approach, however, has been the use of higher skew values, resulting in longer access times, which is not conducive to high performance.

Therefore, there exists a need for a method of determining skew values for each drive and implementing the values to each drive in a manner that is conducive to high performance disk drives.

SUMMARY OF THE INVENTION

The present invention satisfies this need.

A general object of the present invention is to determine and implement skew values to improve disk drive performance.

More specifically, head skew and cylinder skew values are calculated and implemented for each drive during a production test phase of the disk drive manufacturing process.

In one aspect of the present invention, data measured during the production test phase of a disk drive manufacturing process is used to calculate and implement skew values.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

The present invention will now be described in detail with reference to a few preferred embodiments thereof as illustrated in the accompanying drawings. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

The present invention involves the adaptive determination of skew values for individual disk drive units, during the production test phase of the disk drive manufacturing process. As referred to herein and as known to those skilled in the art, "production test phase" refers to a phase during the disk drive manufacturing process, after the disk drive has been assembled but before the drive leaves the factory, when each drive undergoes a series of tests. In addition, as used herein, "disk drive manufacturing process" refers to the totality of steps involved in manufacturing a disk drive, including the assembly, testing, etc. In accordance with the present invention, head skew and cylinder skew values are calculated using information collected during the production test phase. The present invention utilizes this data to calculate and implement skew values for each drive by including instructions in the production test firmware expressly for that purpose.

Figure 1:
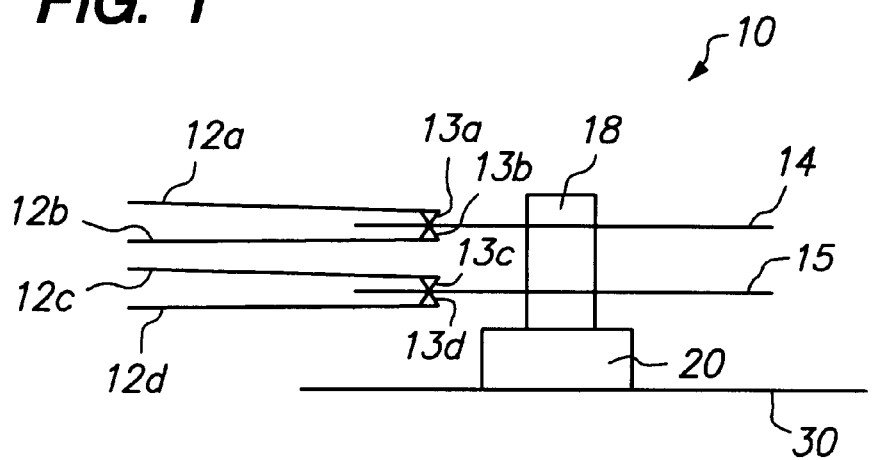
FIG. 1 is a side elevational view of a representation of a disk drive assembly in accordance with the present invention.

FIG. 1 is a diagrammatic and simplified representation of a disk drive in which the present invention finds utility. In the FIG. 1 representation, disk drive 10 includes rotating rigid disks 14 and 15 mounted on rotating spindle 18. Each rigid disk is typically made of a metallic material, e.g., aluminum, and coated with a thin layer of magnetic material in a manner that allows data to be recorded on the top and bottom surfaces. DC motor 20 is mounted to a baseplate 30 and rotates the spindle 18 and rigid disks 14 and 15. FIG. 1 also shows disk drive 10 as having a plurality of actuator arms 12a, 12b, 12c, and 12d. As shown, mounted at one end of each actuator arm is a read/write head, represented as 13*a*, 13*b*, 13*c*, and 13*d*, used to record data on the disk medium and to retrieve data from the disk medium. Each of the actuator arms 12*a*, 12*b*, 12*c*, and 12*d* and its attached head 13*a*, 13*b*, 13*c*, and 13*d* is associated with and unique to one and only one disk surface and forms part of an integrated actuator assembly (not shown). The actuator assembly is designed to permit controlled movement of the actuator arms, moving all actuator arms simultaneously as a unit from track to track.

Figure 2:
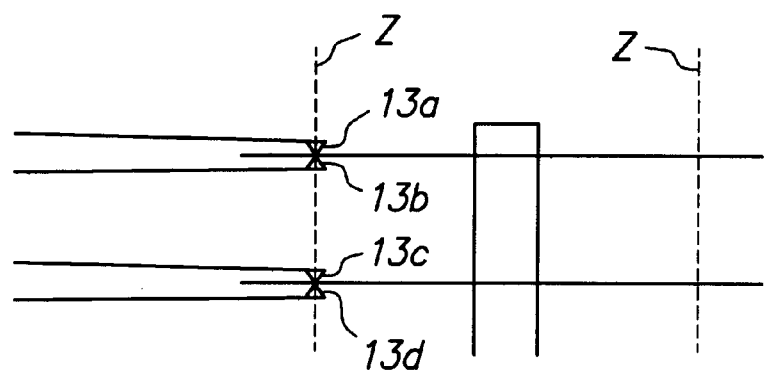
FIG. 2 is another side elevational view of the data storage disk of FIG. 1, illustrating a cylinder.

Data are organized into segments called 'data sectors' and written to the disk medium in recording zones comprised of fixed areas in the form of concentric tracks spaced closely together. Typically, many sectors are recorded on each track. For each concentric track on a disk surface there is a corresponding concentric track in the same relative position on each of the other disk surfaces of the disk drive unit. The term 'cylinder' describes this relationship and is illustrated in FIG. 2, which shows read/write heads 13*a*, 13*b*, 13*c* and 13*d* aligned on respective tracks that define cylinder z (represented by the dashed line). Thus, a cylinder is composed of a number of tracks that are in turn composed of a number of sectors. Traditionally, a drive would have the same number of tracks per cylinder as the number of active read/write heads present. For example, in a rigid disk drive having two disks (four surfaces and four read/write heads), the drive would have four tracks per cylinder.

Figure 3:
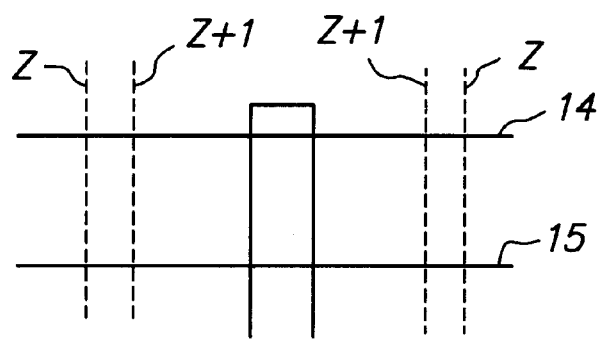
FIG. 3 is a side elevational view of the data storage disk of FIG. 2 illustrating two separate cylinders.

A 'seek' process encompasses activities associated with positioning the heads to a predetermined location on the disk drive medium to initiate data recording and data retrieval sequences. The seek process will typically involve one or both of the following steps:

a. "Single cylinder seek", also known as "cylinder switch" involves operating the actuator to move the heads across the disk surfaces. This motion permits moving the heads from cylinder to cylinder, as required. Moving the heads from a cylinder to the next adjacent cylinder, e.g. moving from cylinder z to cylinder z+1 (shown in FIG. 3), is known as a single cylinder seek.

b. "Head selection", also known as "head switch", involves activating different read/write heads to be used during a required data transfer. For example, a head switch occurs when, in FIG. 2, a data transfer requires read/write heads 13*a* and 13*b* to be activated.

Figure 4:
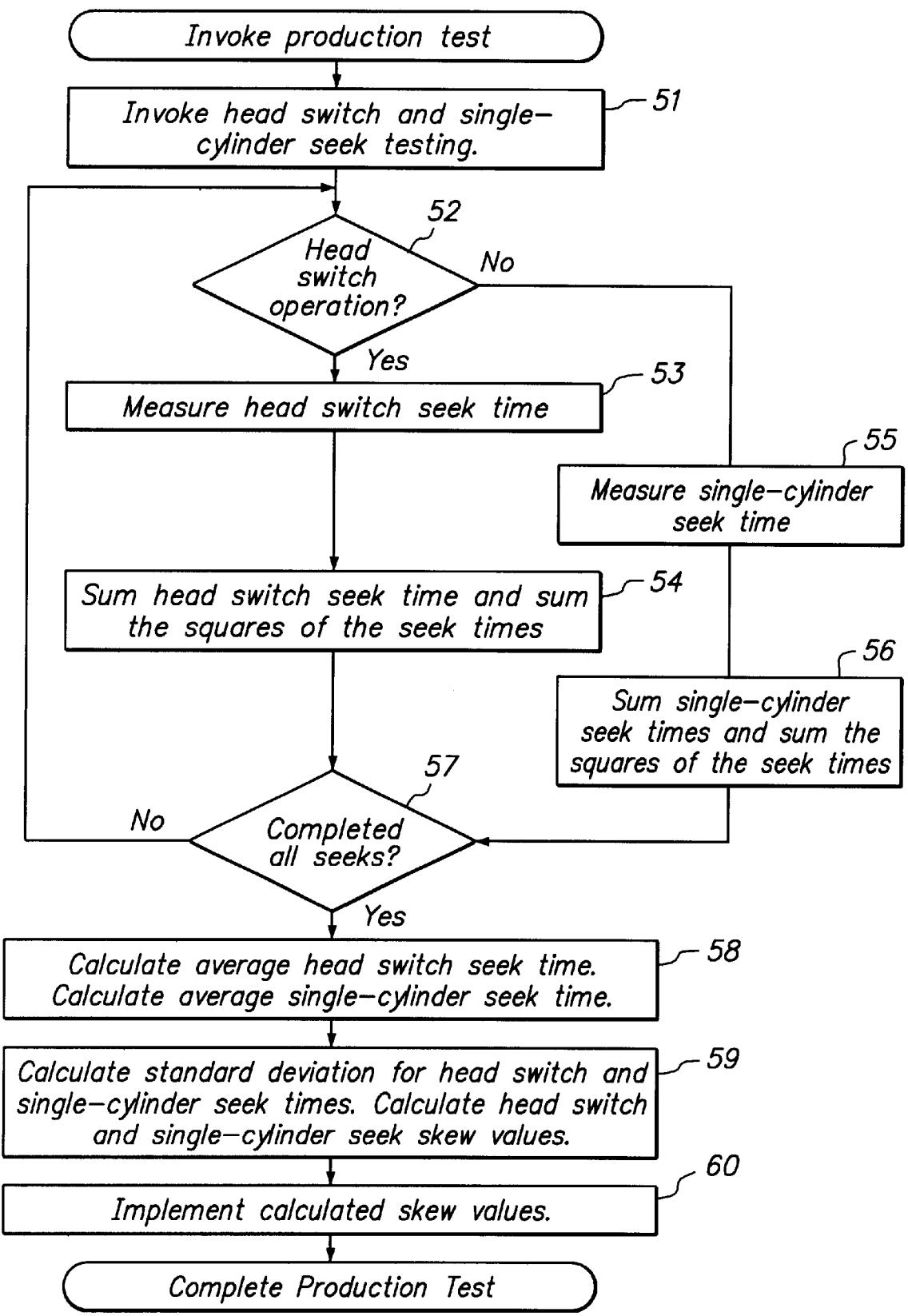
FIG. 4 is a flow diagram representation of a method for calculating and setting head skew and cylinder skew in accordance with principles of the present invention.

FIG. 4 demonstrates a method for executing the seek tests and the subsequent skew value calculations. After initializing for the seek tests at step 51, the system next determines whether a head switch or single cylinder seek is involved at step 52. If a head switch is involved, head switch seek time h is then measured at step 53. Then at step 54, the seek times, h, are preferably summed in the following manner:

$$\sum_{i=1}^{n} h_i = \sum_{i=1}^{n-1} h_i + h_n$$

where $n$=the total number of individual head switch operations=(number of read/write heads−1)*(number of cylinders in the drive)

Preferably, the sum, $\Sigma h$, is updated after every measured seek time. Typically, h is measured in either time (msec) or wedge count.

As shown, a summation of the square of the head switch seek times, h, is also performed at step 54 in the following manner $$\sum_{i=1}^{n} h_i^2 = \sum_{i=1}^{n-1} h_i^2 + h_n^2$$

where n and h are as described above.

Alternatively, if a single cylinder seek is involved, the single cylinder seek time c is measured for all single cylinder seeks at step 55. Then, at step 56 the sum of the seek times are calculated in the following manner $$\sum_{i=1}^{m} c_i = \sum_{i=1}^{m-1} c_i + c_m$$

where m represents the total number of individual single cylinder seek operations. Preferably, the sum is updated after each single cylinder seek time measurement.

A sum of the square of the single cylinder seek times, c, is also performed at step 56 in the following manner $$\sum_{i=1}^{m} c_i^2 = \sum_{i=1}^{m-1} c_i^2 + c_m^2$$

where m and c are as described above. As illustrated in FIG. 4, the measurement and calculation of seek times are repeated until the last track is identified at step 57.

At step 58 standard deviations for head switch seek time and single cylinder seek time are calculated. Standard deviation of head switch seek time summations, $S_h$ is calculated according to the following formula:

$$s_h = \sqrt{\frac{\sum_{i=1}^{n} h^2 - \frac{\left(\sum_{i=1}^{n} h\right)^2}{n}}{n-1}}$$

In addition, standard deviation $S_c$ for single cylinder seek time summations is calculated according to the following formula:

$$s_c = \sqrt{\frac{\sum_{i=1}^{n} c^2 - \frac{\left(\sum_{i=1}^{n} c\right)^2}{n}}{n-1}}$$

At step 58, depending on whether a head switch or single cylinder seek test has been invoked, the average head switch and single cylinder seek times are determined for all n and m values.

Using the average seek time and standard deviations from above, skew values are then determined at step 59. Specifically, head skew, $skew_h$, is calculated according to the following relationship:

$$skew_h = \left(\frac{\sum_{i=1}^{i=n} h}{n}\right) + (as_h) + \Delta_h$$

where "a" represents a coefficient of standard deviation based on the Normal Probability Distribution Curve and $\Delta_h$ denotes a compensation value that can be specified for performance matching and/or control purposes. A typical default value is zero. The coefficient value "a" is selected based on the percentage of time that slipped revolutions will be allowed to occur. It is set in accordance with specific user requirements and specifications. For example, if slipped revolutions will be allowed 5% of the time, the coefficient value a=1.645. Slipped revolutions are generally considered detrimental to drive performance. However, as explained above, the ironic consequence of avoiding slipped revolutions is that skew times may be lengthened, which is inconsistent with high performance requirements. Therefore, by allowing slipped revolutions to occur in a certain percentage of the time, the present invention is able to enhance performance.

Using the average of the single cylinder seek times and the standard deviation values derived as above, cylinder skew $skew_c$ is also determined at step 59 by the following relationship:

$$skew_c = \left(\frac{\sum_{i=1}^{i=n} c}{n}\right) + (as_c) + \Delta_c$$

where a, as described above, is the coefficient of standard deviation and represents the percentage of slipped revolutions allowed. Similarly to $\Delta_h$, $\Delta_c$ represents a performance compensation value for cylinder skew. It should be understood that standard deviation of head switch and single cylinder seek times may be determined using methods/formulas other than those presented in this discussion.

Once determined, skew values $skew_c$ and $skew_h$ are implemented into the particular drive that the measured seek times were obtained from, at step 60, by storing the values to drive configuration pages of read/write zones. In the preferred embodiment described above, standard deviation and skew values for both head switch and single cylinder seeks were calculated within the same respective steps. It should be understood, that alternatively, the aforementioned values may be calculated in separate steps.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method of determining skew settings in a disk drive, the method comprising the steps of:
   initiating a head switch and single cylinder seek tests of the disk drive;
   measuring a head switch seek time for each head selection operation;
   computing an average head switch seek time;
   computing a standard deviation of the head switch seek times; and
   computing a head skew based on the average and the standard deviation of the head switch seek times.

2. The method of claim 1 further comprising the steps of:
   measuring a single cylinder seek time for each single cylinder seek operation;
   computing an average single cylinder seek time;
   computing a standard deviation of the single cylinder seek times; and
   computing a cylinder skew based on the average and the standard deviation of the single cylinder seek times.

3. The method of claim 2 wherein the step of computing the standard deviation of the single cylinder seek time further comprises the step of summing the measured single cylinder seek times.

4. The method of claim 3 wherein the step of summing the measured single cylinder seek times further comprises the step of determining a sum after all single cylinder seek times have been measured.

5. The method of claim 2 wherein the step of computing the standard deviation of the single cylinder seek time further comprises the step of summing the square of each measured single cylinder seek time.

6. The method of claim 5 wherein the step of summing the square of each measured single cylinder seek time further comprises the step of determining a sum after all single cylinder seek times have been measured.

7. The method of claim 1 wherein the step of computing the standard deviation further comprises the step of summing the square of each measured head switch seek time.

8. The method of claim 7 wherein the step of summing the square of each measure head switch seek time further comprises the step of determining a sum after all head switch seek times have been measured.

9. The method of claim 1 wherein the step of computing the standard deviation further comprises the step of summing the measured head switch seek times.

10. The method of claim 9 wherein the step of summing the measured head switch seek times further comprises the step of determining a sum after all head switch seek times have been measured.

11. During a disk drive production test, a method of determining skew settings for a disk drive, the method comprising the steps of:
    measuring a head switch seek time for each head selection operation during a head switch seek test;
    calculating an average of the head switch seek times;
    calculating a standard deviation of the head switch seek times;
    measuring a single cylinder seek time for each single cylinder seek operation during a single cylinder seek test;
    calculating an average of the single cylinder seek times;
    calculating a standard deviation of the single cylinder seek times;
    determining a head skew based on the average and the standard deviation of the head switch seek times; and
    determining a cylinder skew based on the average and the standard deviation of the measured single cylinder seek times.

12. A method of manufacturing a disk drive comprising the steps of:
    initiating a production test of the disk drive;
    measuring a head switch seek time for each head switch during a head switch seek test;
    computing an average of the head switch seek times;
    computing a standard deviation of the head switch seek times;
    computing a head skew based on the average and the standard deviation of the measured head switch seek times; and
    implementing the head skew to the disk drive.

13. The method of claim 12 further comprising the steps of:

measuring a single cylinder seek time for each single cylinder seek during a single cylinder seek test;

computing an average of the single cylinder seek times;

computing a standard deviation of the single cylinder seek times;

computing a cylinder skew based on the average and standard deviation of the measured single cylinder seek times; and implementing the cylinder skew to the disk drive.

14. The method of claim 13 wherein the step of computing the standard deviation of the measured cylinder seek times further comprises the step of summing the square of each measured single cylinder seek time.

15. The method of claim 13 wherein the cylinder skew permits a predetermined percentage of slipped revolutions to occur in the disk drive.

16. The method of claim 12 wherein the step of computing the standard deviation of the measured head switch seek times further comprises the step of summing the square of each measured head switch seek time.

17. The method of claim 12 wherein the head skew permits a predetermined percentage of slipped revolutions to occur in the disk drive.

18. A disk drive comprising:

a baseplate;

at least one storage disk rotatably coupled to the baseplate, the at least one storage disk including a plurality of concentric tracks defined thereon;

an actuator having at least one actuator arm to position a read/write head at one of the plurality of concentric tracks; and head skew settings determined during a production test phase that includes measuring a seek time for each head switch during a head switch seek test, calculating an average of the head switch seek times, and calculating a standard deviation of the measured head switch seek times.

19. The disk drive of claim 18 further comprising a cylinder skew setting.

20. The disk drive of claim 19 wherein the cylinder skew setting is determined during a production test phase that includes measuring seek times for all single cylinder seeks during a single cylinder seek test, calculating an average of the single cylinder seek times, and calculating a standard deviation of the single cylinder seek times.

21. A disk drive comprising:

a baseplate;

at least one storage disk rotatably coupled to the baseplate, the at least one storage disk including a plurality of concentric tracks defined thereon;

an actuator having at least one actuator arm to position a read/write head at one of the plurality of concentric tracks; and a cylinder skew setting determined during a production test phase that includes measuring seek times for all single cylinder seeks during a single cylinder seek test, calculating an average of the single cylinder seek times, and calculating a standard deviation of the single cylinder seek times.

22. The disk drive of claim 21 further comprising a head skew setting.

23. The disk drive of claim 22 wherein the head skew setting is determined during a production test phase that includes measuring a seek time for each head switch during a head switch seek test, calculating an average of the head switch seek times, and calculating a standard deviation of the measured head switch seek times.

24. A method of determining skew settings in a disk drive, the method comprising the steps of:

performing a plurality of head selection operations;

measuring a head switch seek time for at least two of the head selection operations;

computing a standard deviation of the head switch seek times; and computing a head skew based on the standard deviation of the head switch seek times.

25. The method of claim 24 wherein the step of computing the standard deviation includes summing the square of each measured head switch seek time.

26. The method of claim 25 wherein the step of summing the square of each measured head switch seek time includes determining a sum after all head switch seek times have been measured for the at least two head selection operations.

27. The method of claim 24 wherein the step of computing the standard deviation includes summing the measured head switch seek times.

28. The method of claim 27 wherein the step of summing the measured head switch seek times includes determining a sum after all head switch seek times have been measured for the at least two head selection operations.

29. The method of claim 24 further comprising the step of computing an average of the head switch seek times.

30. The method of claim 29 wherein the step of computing a head skew includes basing the head skew on the average of the head switch seek times.

31. A method of determining skew settings in a disk drive, the method comprising the steps of:

performing a plurality of single cylinder seek operations;

measuring a single cylinder seek time for at least two of the single cylinder seek operations;

computing a standard deviation of the single cylinder seek times; and computing a cylinder skew based on the standard deviation of the single cylinder seek times.

32. The method of claim 31 wherein the step of computing the standard deviation of the single cylinder seek time includes summing the measured single cylinder seek times.

33. The method of claim 32 wherein the step of summing the measured single cylinder seek times includes determining a sum after all single cylinder seek times have been measured for the at least two single cylinder seek operations.

34. The method of claim 31 wherein the step of computing the standard deviation of the single cylinder seek time includes summing the square of each measured single cylinder seek time.

35. The method of claim 34 wherein the step of summing the square of each measured single cylinder seek time includes determining a sum after all single cylinder seek times have been measured for the at least two single cylinder seek operations.

36. The method of claim 31 further comprising the step of computing an average of the single cylinder seek times.

37. The method of claim 36 wherein the step of computing the cylinder skew includes basing the cylinder skew on the average of the single cylinder seek times.

38. The method of claim 31 further comprising the steps of measuring a head switch seek time for each head selection operation, computing a standard deviation of the head switch seek times, and computing a head skew based on the standard deviation of the head switch seek times.

39. A disk drive comprising:

a baseplate;

a storage disk rotatably coupled to the baseplate, the storage disk including a plurality of tracks;

a read/write head;

an actuator having at least one actuator arm to position the read/write head proximate one of the tracks; and a head skew setting determined by measuring a seek time for at least two head switches during a head switch seek test, and calculating a standard deviation of the measured head switch seek times.

40. The disk drive of claim 39 further comprising a cylinder skew setting.

41. The disk drive of claim 40 wherein the cylinder skew setting is determined during a production test phase that includes measuring at least two single cylinder seek times during a single cylinder seek test, and calculating a standard deviation of the measured single cylinder seek times.

42. A disk drive comprising:

a baseplate;

a storage disk rotatably coupled to the baseplate, the storage disk including a plurality of tracks;

a read/write head;

an actuator having at least one actuator arm to position the read/write head proximate one of the tracks; and a cylinder skew setting determined by measuring at least two single cylinder seek times during a single cylinder seek test, and calculating a standard deviation of the measured single cylinder seek times.

43. The disk drive of claim 42 further comprising a head skew setting.

44. The disk drive of claim 43 wherein the head skew setting is determined during a production test phase that includes measuring at least two head switch seek times during a head switch seek test, and calculating a standard deviation of the measured head switch seek times.

* * * * *